United States Patent Office 3,144,991
Patented Aug. 18, 1964

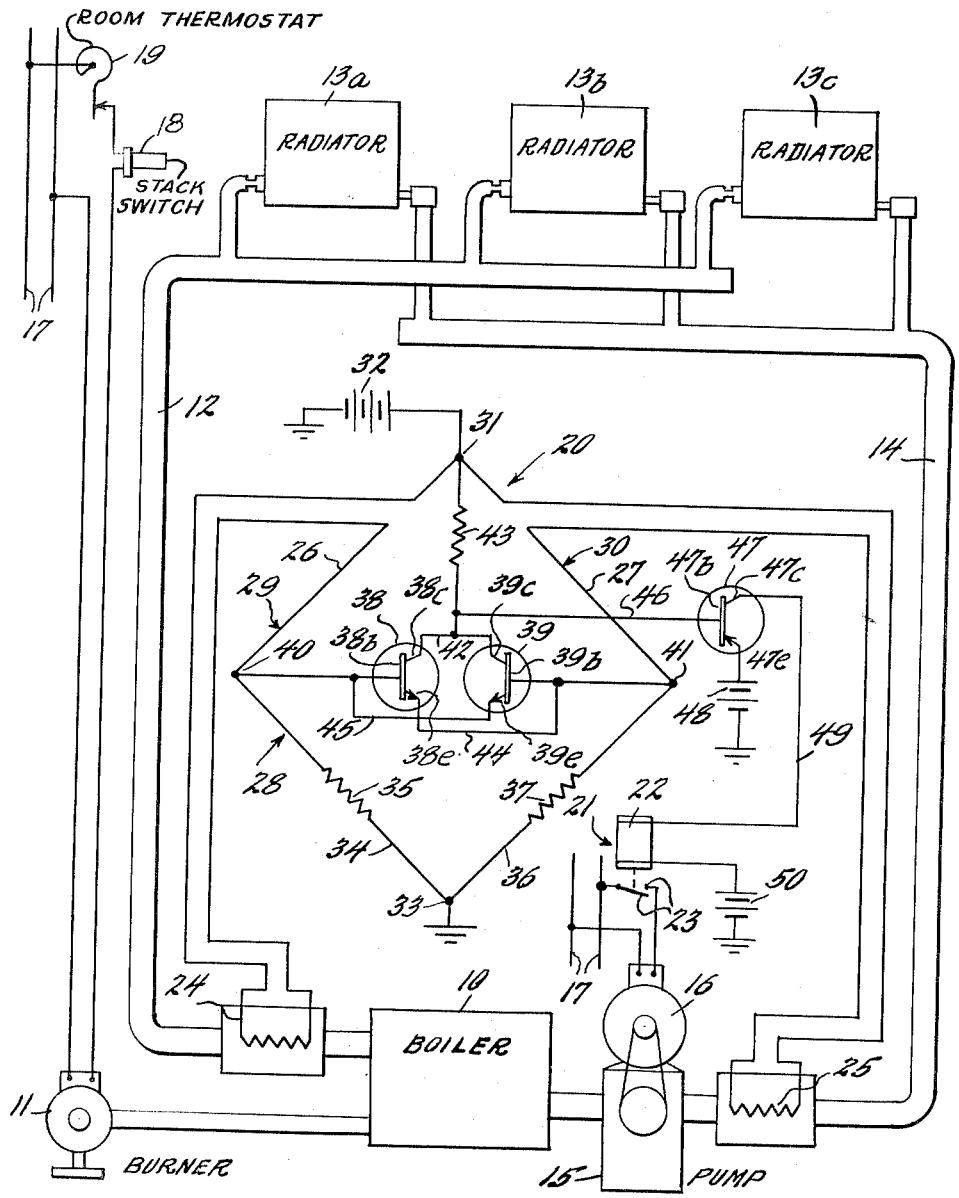

3,144,991
HOT WATER HEATING SYSTEM HAVING A WIDE RANGE TEMPERATURE EQUALIZER CONTROL
Henry F. Marchant, 3226 1st St. N., Arlington, Va.
Filed Feb. 5, 1963, Ser. No. 256,375
4 Claims. (Cl. 237—8)

The present invention relates in general to heating system controls, and more particularly to a wide range temperature equalizer control for automatically maintaining the temperature of the heat conducting medium at different selected points in a forced circulation heating system within a narrow differential temperature range. While the present control system is applicable to different types of heating system installations and heat conducting mediums, it will be described in connection with hot water heating systems having a furnace as the primary heat source for convenience of understanding.

Heretofore, heating systems involving forced circulation of a heat conducting medium, particularly of the hot water type, have customarily employed a room thermostat for initiating combustion in a central furnace to heat the boiler water supply when the room or other space to be heated demands heat, the period of combustion being automatically terminated when the boiler temperature reaches a pre-set level or when a pre-selected cycle time has expired. A circulating device, such as a pump, is controlled by pre-set switches to commence forced circulation of the water through the heating system loop formed by the radiators when the temperature of the boiler water rises above a pre-set temperature in an ascending direction and to terminate forced circulation when the boiler water temperature falls below a pre-set temperature in a descending direction. The sensors used for beginning and ending energization of the circulating pump are usually thermostatic switches located in direct heat exchange relation with the boiler water.

Such a system does not facilitate attainment of efficient operating conditions as the furnace and pump controls do not regulate distribution of heat as a function of variations in the temperature of the water in the parts of the system exterior to the boiler. Since the pump controls have to be pre-set to one temperature or set of temperatures at the boiler, water circulation is only responsive to variations in temperature at the boiler, so that localized changes in water temperature in a part of the space being served by the furnace will not produce regulation of the furnace and circulating pump in a manner which will insure efficient operation. For example, if the temperature of the furnace ran under the temperature setting of the pump control, the pump would not run at all, or if the furnace ran on or over the pump temperature control, the pump would operate continuously. Also, if the temperature in a room or zone remote from the room thermostat was subjected to more intense cooling than the rest of the house, operation of the furnace would not efficiently reflect the conditions in this localized area, and heat generation and circulation either would be inadequate for the requirements of the localized area or would overshoot the requirements of the other areas.

An object of the present invention, therefore, is the provision of a novel heating system temperature equalizer control which is of relatively inexpensive manufacture and simple operation, and which will maintain temperatures at various parts of the heating system in proper balance to improve efficiency of operation.

Another object of the present invention is the provision of a novel temperature equalizer control for heating systems which responds to pre-selected differences in temperature of the heat conducting medium at plural points in the system to effect forced circulation of the medium in a manner to maintain a desired temperature balance throughout the system.

Another object of the present invention is the provision of a novel temperature equalizer control for hot water heating systems and the like which responds to pre-selected differences in temperature of water leaving the furnace boiler and water returning to the furnace boiler to activate a water circulating pump and maintain a selected temperature balance between the leaving water and return water temperatures throughout the entire heating range of the furnace.

Other objects, advantages, and capabilities of the present invention will become apparent from the following detail description, taken in conjunction with the accompanying drawing illustrating a preferred embodiment of the invention.

In the drawing:

The drawing is a schematic diagram of a temperature equalizer control for heating systems embodying my invention.

The present invention, in general, involves the provision of temperature sensitive resistors or other temperature sensors on or in the fluid supply line from a boiler of a heating system to the heating exchange devices in the zones to be heated, and on or in the fluid return line from said heating exchange devices to the boiler, to provide regulation of the fluid circulating period as a function of variation in the temperature of the heat conducting medium in the supply and return lines. The differential temperature between two points is sensed by the sensing means and is used as a control function for regulating the circulating pump for the heat conducting medium to circulate the medium throughout the system whenever a pre-determined difference in temperature occurs so as to preserve a pre-determined balance or evening out of the temperature of the heat conducting medium throughout the system.

Referring particularly to the exemplary form of the present invention illustrated in the accompanying drawing, there is shown a boiler 10 of a heating system of the hot water, low pressure, closed loop type, the water in the boiler 10 being heated by a conventional burner 11 and being conducted by a common supply conduit 12 from the boiler to a plurality of radiators 13a, 13b and 13c located in the zones to be heated. The water is returned to the boiler through a common return conduit 14 through circulating pump 15 interposed in the return conduit 14 and driven by a pump motor 16. Both the pump motor 16 and the burner 11 are energized from a conventional line voltage supply 17, for example a 110 volt supply, and the burner 11 is automatically activated in the conventional manner to elevate the temperature of the water in the boiler 10 to the desired level by a control circuit including a temperature responsive device 18 located in the furnace stack (which merely cuts off the burner when stack temperature fails to reach a pre-selected level in a selected time) and a room thermostat 19. In accordance with conventional practice, the burner 11 is energized and deenergized responsive to closure and opening of the switch incorporated in the room thermostat 19.

If the temperature responsive device 18 and the room thermostat were the only automatic controls for the heating system, and the pump motor 16 were controlled in accordance with conventional practice by a temperature responsive device in the boiler which energizes the circulating pump 15 when the boiler water reached a preselected initial temperature level in the increasing temperature phase and which deenergized the pump when the boiler water reached a preselected terminal temperature in a descending temperature phase, poor efficiency would be realized as in most cases the circulating pump would not be controlled in closely coordinated relation to the temperature conditions obtaining in the various portions of the zone to be heated.

The present invention maintains efficient operating conditions in a simple manner by providing a wide range temperature equalizer control, indicated generally by reference character 20, which regulates a control relay 21 for the pump motor 16 having a relay coil 22 and relay contacts 23, the contacts 23 being interposed in the supply circuit for the pump motor 16 from the line voltage supply 17. The temperature equalizer control 20 in the illustrated embodiment comprises a pair of temperature sensitive resistors 24, 25 interposed in the common supply conduit 12 near the outlet of the boiler 10 and the common return conduit 14, for example near the inlet to the circulating pump 15. These temperature sensitive resistors 24, 25 may be of a type which vary from about 280 ohms under cold conditions to about 19 ohms under hot conditions, and are connected in series in legs 26, 27 of a bridge circuit 28. The bridge circuit 28 includes a pair of branches 29, 30 connected in parallel between supply point 31, supplied for example with 4.5 volts D.C. by a battery 32, and ground point 33, the branch 29 including the leg 26 and a leg 34 having a resistor 35 therein, and the branch 30 including the leg 27 and leg 36 having a resistor 37 therein. The resistors 35 and 37 may, for example, be 280 ohms resistors which are not temperature sensitive. A pair of N.P.N. transistors 38 and 39, for example 2N35 transistors, have their bases 38b and 39b connected directly with the mid-points 40 and 41, respectively, of the branches 29, 30 of the bridge 28, while the collectors 38c and 39c are connected together through a common lead 42 and load resistor 43 (for example a 10K ohm resistor) to the supply point 31 of the bridge. The emitters 38e and 39e of the two transistors are connected directly by leads 44, 45 to the mid points 41 and 40 respectively. A lead 46 is connected to the common lead 42 between the transistor collectors 38c, 39c, and to the base 47b of transistor 47, the emitter 47e of which is connected to a bias source, for example battery 48, and the collector 47c of which is connected by lead 49 to a terminal of the relay coil 42, the other terminal of which is connected to a D.C. bias source such as 3 volt battery 50.

Assuming that the temperature of the water in the heating system is substantially uniform throughout the system, the temperature, and therefore the electrical resistance, of the two temperature sensitive resistors 24, 25 will be substantially equal, provided there are substantially equal voltage levels at the two mid-points 40 and 41 of the bridge 28. These resistors 24 and 25 preferably have negative coefficients so that as the temperature rises at said resistors, the electrical resistance goes down and there is accordingly a lower voltage drop across them. The circuit is preferably adjusted so that the relay 21 will not be energized until an approximate 10° temperature differential occurs between the locations of the temperature sensitive resistors 24 and 25. If, due to an increase in the temperature of the boiler water, for example, by firing of the burner 11, the temperature of the resistor 24 rises 10° above the temperature of resistor 25, a lower voltage drop will occur across resistor 24, which will relatively increase the voltage at the mid-point 40 of branch 29. This will make the bias to transistor 38 sufficiently more positive than the emitter 38e to turn on transistor 38, which in turn produces a voltage drop across the common load resistor 43 sufficient to forward bias the base 47b of transistor 47 and turn on transistor 47 to close the contacts 23 of relay 21, thereby energizing the motor 16 of the circulating pump 15. The circulating pump 15 will continue in operation to rapidly circulate water through the entire system, mixing higher temperature water and lower temperature water until a more uniform temperature is obtained throughout the system. When the temperature of resistor 25 then warms up or the temperature of resistor 24 cools down to points again providing substantial equal voltages at mid-points 40 and 41 of the bridge 28, conduction through the transistors 38, 39 will be terminated, thus terminating conduction through the common load resistor 43 and cutting off transistor 47 to de-energize relay 21 and stop circulating pump 15. It will be apparent that a voltage differential in the opposite sense between mid-points 41 and 40 of the bridge 28, as for example when the temperature at resistor 25 exceeds the temperature of resistor 24 by 10° or other selected temperature differential, the same function will be performed as described above except that transistor 38 will first be biased to conduction which then drops the voltage at the lower end of the common load resistor 43 to trigger on transistor 47 and energize relay 21 and circulating pump motor 16.

Since the transistors 38, 39 are connected between mid-points 40, 41 of the bridge 28 to respond to pre-selected differences in voltage between these two points by connecting the base to one mid-point and the emitter to the opposite mid-point, the wide range temperature equalizer control 20 responds to temperature differentials between the supply conduit 12 and return conduit 14 at all temperature conditions of the boiled water. Thus if the heating system is started up from a cold or room temperature condition, it is apparent that the circulating pump 15 will be energized each time the temperature difference in the water at the locations of the resistors 24 and 25 reaches 10° F. or such other temperature differential as is selected, to rapidly mix the warmer and cooler water in the heating system and effect substantial uniform distribution of temperature throughout the system. Similarly, if one of the resistors or heat exchangers, for example radiator 13c, is located in a room which suffers a greater heat loss than the other rooms being served, the wide range temperature equalizer system will maintain more efficient operation because each time the relatively greater heat exchange loss from the radiator 13c is reflected in a reduction in temperature of the return water sensed by resistor 25 to a sufficient extent as to exceed the preselected temperature differential, the circulating pump 15 will be energized to force the warmer water from the portions of the system associated with the radiators 13a, 13b to the radiator 13c and achieve more uniform distribution of the heat conducting water throughout the system. In many cases, operation of the circulating pump 15 to maintain uniformity of water temperature in the radiator portions of the system is all that is necessary to properly maintain the desired temperature in the greater heat loss zones so that the burner 11 will not need to be cycled as frequently as in conventional control systems. It will be apparent that if, in a conventional control system, the thermostat were located in the zone which suffers greatest heat loss, energization of the burner 11 each time that the more exposed zone demands heat would produce poor efficiency as the less exposed zones would be supplied with unnecessary heat, whereas in the present system, the heated water is uniformly distributed between all radiator zones without necessitating as frequent operation of the burner.

While but one preferred example of the present invention has been particularly shown and described, it is apparent that various modifications may be made therein within the spirit and scope of the invention, and it is desired, therefore, that only such limitations be placed on the invention as are imposed by the prior art and set forth in the appended claims.

What is claimed is:

1. Apparatus for automatically controlling flow of a temperature conditioned medium in a thermal interchange system responsive to occurrence of a preselected temperature differential between selected spaced zones in the system to maintain the temperature of the conditioned medium at the spaced zones substantially equalized comprising an electrical bridge circuit having a pair of input terminals, means applying a potential across said input terminals, said bridge circuit including a pair of parallel branches connected between said input terminals having intermediate junction points and corresponding fixed resistors between said junction points and one of said input terminals maintaining a fixed electrical resistance value in each branch between said junction points and said last-mentioned input terminal, a pair of temperature responsive variable resistors whose electrical resistance varies as a function of temperature located at spaced selected zones in the system in heat exchange relation to the conditioned medium, means connecting said variable resistors in the respective opposite branches of said bridge circuit between said junction points and the other of said input terminals, circulating means for producing forced circulation of the conditioned medium through the system, and regulating means automatically responsive to occurrence of a preselected potential difference between said junction points to activate said circulating means and substantially equalize the temperature of the conditioned medium at said spaced zones until the potentials at said junction points return to substantially equal values.

2. Apparatus as recited in claim 1, wherein said regulating means comprises a relay having normally open contacts controlling said circulating means, a pair of normally nonconducting transistors connected between the junction points of said branches to cause conduction of one of the transistors responsive to a selected difference of either polarity sense between the voltage drops across said temperature responsive resistors until the voltage drops return to substantially equal value, and circuit means connecting said relay to said transistors to activate said relay to close said contacts responsive to conduction of either of said transistors.

3. A heating system of the hot water, closed loop type comprising a plurality of heat exchangers in zones to be heated, boiler means for heating water to be supplied to said heat exchangers, conduit means connecting said boiler means and heat exchangers in a closed loop including a common supply conduit and a common return conduit connected to said boiler means, a burner for said boiler means for generating heat to elevate the temperature of the water, thermostatic means in a space to be served by said heat exchangers connected to said burner by a first circuit for activating said burner when the space temperature attains a selected level, a motor driven pump interposed in said return conduit for circulating water through the system, an electrical resistance bridge independent of said first circuit having a feed point connected to a source of potential and a base point connected to a reference potential, a pair of parallel branches extending between said feed point and base point each having an intermediate junction point, said bridge including corresponding fixed resistors in each branch thereof between said junction point and said base point and corresponding temperature responsive variable resistors between said junction points and said feed point, the electrical resistance of said variable resistors varying inversely with temperature and being disposed in heat exchange relation with the water in said supply and return conduits respectively, and regulated means automatically responsive to occurrence of a preselected potential difference between said junction points for energizing said pump to circulate water through the closed loop and substantially equalize water temperature throughout the same until the potentials at said junction points return to substantially equal value.

4. A heating system of the hot water, closed loop type comprising a plurality of heat exchangers in zones to be heated, boiler means for heating water to be supplied to said heat exchangers, conduit means connecting said boiler means and heat exchangers in a closed loop including a common supply conduit and a common return conduit connected to said boiler means, a burner for said boiler means for generating heat to elevate the temperature of the water, thermostatic means in a space to be served by said heat exchangers connected to said burner by a first circuit for activating said burner when the space temperature attains a selected level, a motor driven pump interposed in said return conduit for circulating water through the system, an electrical resistance bridge independent of said first circuit having a feed point connected to a source of potential and a base point connected to a reference potential, a pair of parallel branches extending between said feed point and base point each having an intermediate junction point, said bridge including corresponding fixed resistors in each branch thereof between said junction point and said base point and corresponding temperature responsive variable resistors between said junction points and said feed point, the electrical resistance of said variable resistors varying inversely with temperature and being disposed in heat exchange relation with the water in said supply and return conduits respectively, a relay having normally open contacts for energizing the pump when closed, a pair of normally non-conducting transistors each having their bases connected to a respective one of said junction points and having their emitters connected to the junction point on the opposite branch to be biased into conduction upon occurrence of a voltage difference between said junction points signifying a selected temperature differential and continue conducting until the voltages at said junction points are substantially equal, and means responsive to conduction of either of said transistors to activate said relay during the period of conduction to energize said pump for circulating water through said conduit means, heat exchangers and boiler means to substantially equalize water temperature throughout the same.

References Cited in the file of this patent

UNITED STATES PATENTS

| | | |
|---|---|---|
| 2,345,277 | McGrath | Mar. 28, 1944 |
| 2,602,591 | Wilson et al. | July 8, 1952 |
| 2,661,907 | Wissmiller | Dec. 8, 1953 |
| 2,859,402 | Schaeve | Nov. 4, 1958 |
| 2,868,461 | Gaddis | Jan. 13, 1959 |
| 2,956,576 | McKeggie | Oct. 18, 1960 |
| 3,051,873 | Jensen | Aug. 28, 1962 |